Patented May 16, 1933

1,908,995

UNITED STATES PATENT OFFICE

FREDERICK W. MILLER, JR., OF WILMINGTON, DELAWARE, ASSIGNOR TO E. I. DU PONT DE NEMOURS & COMPANY, OF WILMINGTON, DELAWARE, A CORPORATION OF DELAWARE

UREA SYNTHESIS

No Drawing.   Application filed May 28, 1931.   Serial No. 540,820.

This invention relates to the synthesis of urea from ammonia and carbon dioxide and more particularly to an improved method for the efficient recovery and reutilization of unconverted raw materials.

It is known that when ammonia and carbon dioxide or their compounds (i. e. ammonium carbamate, carbonate, bicarbonate, or mixtures thereof) are heated together in a closed system urea is formed. The conversion to urea is only partial, however, for while various means have been proposed for improving the efficiency of the reaction, in no case is the theoretical conversion attained. The disposition of the unconverted raw materials has an important bearing upon the ultimate cost of the urea. Various proposals have, therefore, previously been made to develop a self-contained urea process in which the unconverted reactants might be separated from the urea and returned to the synthesis for conversion with fresh portions of reactants.

With a view to overcoming the practical difficulties inherent in previous proposals of the prior art, it is an object of the present invention to provide an improved process for the synthesis of urea from ammonia and carbon dioxide or compounds thereof in which the unconverted ammonium carbamate is recovered and returned to the synthesis for further conversion.

Other objects and advantages of the invention will be apparent from the following specification in which the preferred embodiments are described.

According to the present invention the urea synthesis is effected by introducing into a suitable closed reaction vessel ammonia and carbon dioxide, either as such or combined as ammonium carbamate, ammonium carbonate, or ammonium bicarbonate, an excess of ammonia over the stoichiometrical requirements being employed, ammonium carbamate, methanol, and urea from a preceding cycle being present to the extent and for the purpose hereinafter set forth. The raw materials are submitted to the combined effect of urea-forming temperatures, e. g. from 140-250° C., and the autogenously developed pressure. When equilibrium has been established the synthesis melt is subjected to distillation for the recovery of the unconverted ammonium carbamate. This distillation is accomplished preferably in three steps, in the first of which the major part (preferably as much as practicable) of the excess ammonia is recovered at ammonia-liquefying pressure, and in the second of which the ammonium carbamate, with the residual excess ammonia and most of the methanol are removed by distillation and suitable reflux at a lower pressure and conveyed to a condenser to be brought in contact with a slurry or solution of urea and methanol to form a slightly under-saturated solution of carbamate in methanol and urea. The slurry of methanol and urea is formed in a slurry tank from such methanol as was not distilled with the ammonium carbamate, and solid urea from the urea evaporator. The methanol not removed in the ammonium carbamate distillation is taken out by means of an auxiliary still and condenser and conveyed to the slurry tank. The slightly under-saturated solution of ammonium carbamate in methanol and urea is returned to the autoclave for further conversion with additional quantities of ammonia and carbon dioxide or their compounds, an excess of ammonia being maintained in the synthesis melt. The solution of urea and water from the secondary methanol still is conveyed to a urea evaporator to form solid urea, a part of which is conveyed to the methanol slurry tank as above described.

I have found, as disclosed in my copending application Serial No. 540,881, that methanol may be present in the synthesis without affecting the equilibrium point of the reaction and furthermore I have discovered that by the use of a methanol-urea solution, such as above described, it is possible to condense the ammonium carbamate so that it may be readily returned to the synthesis. As an added feature of this invention I have found that the presence of urea in the methanol-urea solution considerably enhances the solubility of ammonium carbamate therein.

By operating in the foregoing manner ammonium carbamate unconverted in the synthesis autoclave can readily be removed and reutilized, with an overall efficiency and a reduction in production costs not heretofore possible by the known methods. While the invention is applicable to either batch or continuous processes, the synthesis is preferably effected in a continuous manner and it is with reference to a process of this particular kind that the invention is described in the following examples, it being understood that the examples are offered only by way of illustration and that the invention is not limited to the examples.

*Example 1.*—The reaction is effected in a corrosion- and pressure-resistant vessel or autoclave such as is ordinarily used in the synthesis of urea, the same being provided with inlets for the raw materials and outlets for withdrawal of the reaction products. Into this autoclave are introduced initially 89.5 parts by weight of ammonia and 15.9 parts of carbon dioxide, in addition to 7.1 parts of ammonium carbamate, 13.2 parts of urea, and 17.2 parts of methanol from a previous operation of the cycle. The charge is heated to about 150° C. under a pressure of about 100 atmospheres and is maintained under these conditions until little further conversion to urea would take place, this requiring a period of about two hours. The synthesis melt is then forced by its own pressure into a primary still in which, as the temperature of the melt falls from 150 to 100° C., substantially all of the excess ammonia is distilled, the distillate being thereafter liquefied, by cooling, and returned to the reaction autoclave. The hot distillation residue, containing the urea, unconverted ammonium carbamate, methanol, water, and a small part of the excess ammonia is transferred to a secondary still where distillation is continued at a temperature of 90–120° C. to remove substantially all of the ammonium carbamate and a major portion of the methanol. The ammonia, carbon dioxide and methanol thus evolved are brought into contact in a condenser with a slurry or solution of urea and methanol. This slurry is formed from methanol obtained from an auxiliary still following the carbamate still and is mixed in a slurry tank with dry urea from the urea evaporator. The ammonia, carbon dioxide, methanol, and urea are adjusted in such proportion as to give a slightly under-saturated solution which is pumped back to the autoclave for further conversion.

In a typical operation effected in the foregoing manner the composition of the melt before the primary distillation was approximately—

77 parts ammonia
7 parts ammonium carbamate
22 parts urea
17 parts methanol
7 parts water After the primary distillation the composition was—

4 parts ammonia
22 parts urea
7 parts carbamate
17 parts methanol
7 parts water.

When the cycle has been established the relative proportions of fresh and recirculated materials introduced into the reaction autoclave are approximately as follows, percentages being by weight. Fresh materials: $CO_2$ 11.2%, $NH_3$ 8.8%. Recirculated materials: $CO_2$ (as carbamate) 2.8%, $NH_3$ (as carbamate) 2.1%, $NH_3$ (uncombined) 54%, urea 9.1%, and methanol 11.9%. Under the foregoing conditions the conversion of ammonium carbamate to urea attained in the autoclave is approximately 80% per pass, whereas the overall efficiency of conversion of the cyclical process approaches as near 100% as the tightness of the system will permit.

*Example II.*—Into an autoclave, such as described in Example I, are introduced initially 26.7 parts by weight of ammonia and 9.4 parts of carbon dioxide, in addition to 7.1 parts of ammonium carbamate, 13.2 parts of urea, and 17.2 parts of methanol from a previous cycle. The charge is heated to about 150° C. under a pressure of about 100 atmospheres and is maintained under these conditions until little further conversion to urea would take place, this requiring a period of about two hours. The synthesis melt is then forced by its own pressure into a primary still in which as the temperature of the melt falls from 150 to 100° substantially all of the excess ammonia is distilled, the distillate being thereafter liquefied by cooling, and returned to the reaction autoclave. The hot distillation residue, containing the urea, unconverted ammonium carbamate, methanol, water, and a small part of the excess ammonia is transferred to a secondary still where distillation is continued at a temperature of 90–120° C., to remove substantially all of the ammonium carbamate and a major portion of the methanol.

In a typical operation effected in the foregoing manner the composition of the melt before the primary distillation was approximately—

19.5 parts ammonia
7. parts ammonium carbamate
26. parts urea
17. parts methanol
4. parts water.

After primary distillation the composition was—

0.1 parts ammonia
26. parts urea
7. parts ammonium carbamate
17. parts methanol
4. parts water.

When the cycle has been established the relative proportions of fresh and recirculated materials introduced into the reaction autoclave are approximately as follows, percentages being by weight. Fresh materials: $CO_2$ 12.7%, $NH_3$ 9.8%. Recirculated materials: $CO_2$ (as carbamate) 5.5%, $NH_3$ (as carbamate) 4.2%, $NH_3$ (uncombined) 26.5%, urea 18%, and methanol 23.5%. Under the foregoing conditions the conversion of ammonium carbamate to urea attained in the autoclave is approximately 70% per pass, whereas the overall efficiency of conversion of the cyclical process approaches as near 100% as the tightness of the system will permit.

With reference to the primary distillation of excess ammonia I have found that where cooling water available for the ammonia liquefaction is not sufficiently cold to effect separation of the desired maximum of ammonia the distillation is advantageously conducted in two stages in the first of which substantially all the ammonia is liquefied merely by cooling and in the second compression is employed as an aid to liquefaction.

It will be understood that where reference is made broadly to ammonia and carbon dioxide as raw materials in the appended claims this is to be taken as including the same either as such or in chemical compounds or combination.

Various changes may be made in the method described without departing from the invention or sacrificing any of the advantages thereof.

I claim:

1. The process for the synthesis of urea from ammonia and carbon dioxide which includes the steps of recovering unconverted ammonium carbamate from the synthesis melt by distilling the same, condensing the distillate in the presence of a solution of methanol and urea to form a solution of ammonium carbamate therein and subjecting said solution, together with additional ammonia and carbon dioxide, to urea-forming temperature and pressure in the presence of a substantial excess of ammonia.

2. The continuous process for the synthesis of urea which comprises subjecting ammonia and carbon dioxide to urea-forming temperature and pressure while maintaining an excess of free ammonia in the synthesis melt, subjecting the melt to a primary pressure distillation in which at least the major part of the excess ammonia is recovered and thereafter to a secondary distillation in which unconverted ammonium carbamate is recovered by condensation in the presence of a solution of methanol and urea to form a solution of ammonium carbamate, and submitting said solution, together with ammonia from the primary distillation and fresh ammonia and carbon dioxide, to urea-forming pressure and temperature.

3. The continuous process for the synthesis of urea which comprises subjecting ammonia and carbon dioxide to urea-forming temperature and pressure while maintaining an excess of free ammonia in the synthesis melt, subjecting the melt to a primary pressure distillation in which at least the major part of the excess ammonia is recovered and thereafter to a secondary distillation in which unconverted ammonium carbamate is recovered by condensation in the presence of a solution of methanol and urea to form a solution of ammonium carbamate, and submitting said solution, together with ammonia and carbon dioxide, to urea-forming pressure and temperature.

4. The process which comprises synthesizing urea from ammonia and carbon dioxide and recovering unconverted reactants, in the presence of a solution of methanol and urea.

In testimony whereof I affix my signature.

FREDERICK W. MILLER, JR.